UNITED STATES PATENT OFFICE 2,419,015

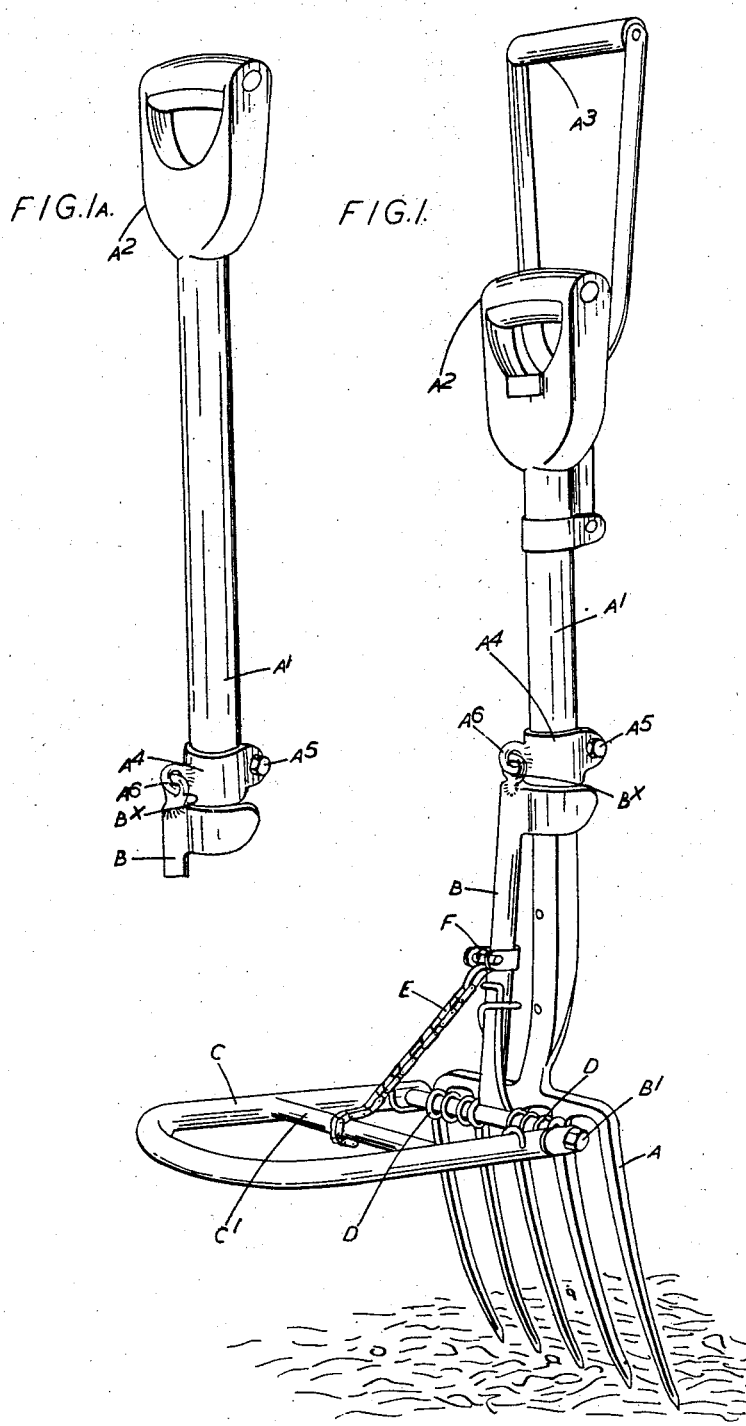

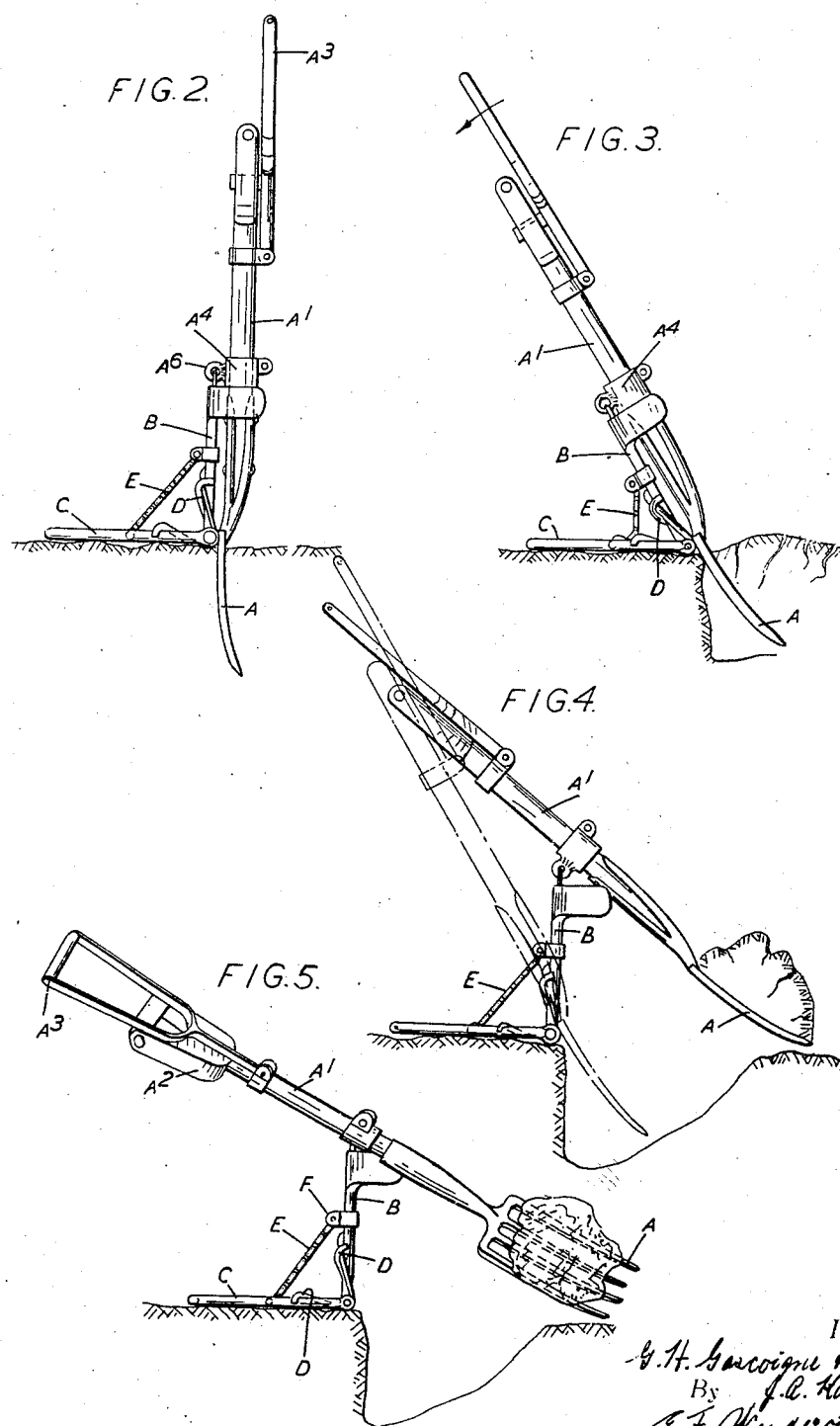

AGRICULTURAL IMPLEMENT

George Harry Gascoigne, Wokingham, and Jonas Arthur Kingston, Tilehurst, Reading, England Application July 25, 1944, Serial No. 546,475
In Great Britain October 5, 1943

7 Claims. (Cl. 254—131.5)

This invention relates to agricultural implements and has particular reference to an improved form of digging implement such as a spade or fork for enabling the soil to be raised and turned over with less tiring effort and more convenient bodily action than usual.

The action of digging with the customary digging implement consists in driving the head of the implement, i. e., the tines in the case of a fork or the blade in the case of a spade, into the soil by a substantially vertical movement downwards and then lowering the handle and shaft by a levering movement about an axis at the surface of the soil where pierced by the tool head. In particular a considerable amount of back bending is involved and the final lifting and scattering of the soil is effected without mechanical advantages, whereas the improved tool of the present invention enables a considerable amount of back bending to be avoided and introduces the assistance of spring means to lift and push forward the soil.

According to the present invention the digging tool is provided with spring means adapted to become energized by the downward levering movement of the tool handle and shaft towards the soil when the tool head is buried therein so that as the soil yields the spring will give out its energy in causing an upward and forward movement of the tool and particularly the tool head and thereby facilitate the displacement and dispersal of the soil.

In the preferred embodiment of the invention the tool is provided with a pivoting axis located at an appreciable height by means of a pedestal the foot of which is placed on the soil and the top of which is attached to the tool shaft at a distance above the tool head approximately equal to the height of the pedestal. The above mentioned spring means may be combined with the said pedestal and a tread plate connected to the foot thereof, so that, as the tool handle and shaft are levered downwards at the ground level to break up the soil, the pedestal rocks inwardly towards the tread plate and energises the spring means which eventually expends its energy and recovers its inert condition by returning the pedestal to the upright position and thereby heaving forwardly and upwardly the tool and especially the tool head and its load of soil as hereinafter more fully explained.

In the preferred construction the top of the pedestal member of the combined pedestal and tread plate is attached to the shaft of the tool by a universal linkage or joint so that the shaft can be turned angularly to right or left in order that its head may deposit the raised soil to right or left. In addition the universal joint enables the tool to be swung bodily to right or left about the top of the pedestal as a pivot as well as to be raised or lowered angularly about such pivot.

The spring means of the embodiment just described may be a helical spring coiled around the hinge pin of the hinged pedestal and tread plate combination.

The shaft and handle of the improved tool may be of the usual form or be provided with an extension, or they may be somewhat modified in both shape and length so as to be more convenient for the somewhat changed manipulation movements.

In order that the invention may be clearly understood and readily carried into effect we will now describe the same more fully with reference to the accompanying drawings, in which:

Figure 1 is a perspective view of a preferred embodiment of the improved tool in the form of a digging fork having its tines applied to the surface of the soil in an attitude ready for being driven in by the pressure of the operator's foot on the cross member of the tines. Figure 1$^a$ is a fragmentary view of a slight modification.

Figure 2 is a side elevation of the tool driven into the soil.

Figure 3 is a side elevation showing the tool in course of being tilted about an axis at the soil level to heave up the soil and energise the spring.

Figure 4 is a side elevation showing a later stage in the operation when the soil resistance has weakened and the energised spring has asserted itself.

Figure 5 is a view similar to Figure 4 but showing the tool tilted sideways to throw off the soil raised by the tool head.

The tool illustrated is an ordinary gardening fork consisting of the tool head or tines A, the shaft $A^1$ and the handle $A^2$. It has an extension with handle $A^3$ attached to it, because the automatic action produced by the spring as hereinafter described renders such an extension desirable.

On the shaft $A^1$ of the tool is a collar $A^4$ attached by means of a clamping bolt $A^5$. The collar $A^4$ is formed with an eye $A^6$.

B is the pedestal the top of which is formed with an eye $B^x$ engaging with the eye $A^6$ on the collar $A^4$. The eyes $A^6$ $B^x$ constitute in effect a universal joint or linkage. The pedestal B is hinged at its base by a hinge pin B¹ to a tread plate or frame C. The spring means operating as between the tread plate and the pedestal is in this embodiment a pair of helical springs D coiled around the hinge pin B¹ and anchored at the ends of the pedestal and the tread plate respectively. E is a length of chain to limit the spreading action of the springs D as between the pedestal and the tread plate. In the particular construction shewn one end of the chain E is attached to a cross bar C¹ of the tread plate C, and the other end is attached to a collar F on the pedestal B by means of a hook which can easily be detached for packing or storing.

In using the improved tool the head is driven into the soil in a substantially vertical direction as indicated in Figures 1 and 2 by foot pressure while steadying the tool by the handle A³, the foot pressure being applied to the cross piece on the head A as usual but also on the tread plate C. When the tread plate C reaches the ground level as seen in Figure 2 the tool head has become buried in the soil and the downward tilting movement of the handle is commenced as shewn in Figure 3 thereby heaving up the soil somewhat and energising the springs D; this tilting movement can be effected in its initial stage without any appreciable back bending, (particularly if the shaft is somewhat unusually long as shewn). As soon as the resistance of the soil has become weakened to such an extent that the springs D can assert themselves, further downward movement of the handle will be found unnecessary because the springs D will assert themselves and heave the tool and especially the head and soil forwards and upwards as shewn in Figure 4.

The operator will soon become accustomed to the spring action and will not resist the same but will anticipate it and will exercise on the handle A³ only a steadying control on the automatic action in passing from the stage of Figure 3 to the stage of Figure 4. A manually controlled twist to right or left of the handle as the spring acts, or immediately after it has acted, will as shewn in Figure 5 deposit the soil to right or left as desired. A too violent or too extensive recovery action by the springs D is prevented or checked by the chain E.

Although the preferred embodiment of the improved implement has been described and illustrated it will be understood that various modifications of construction are possible. For example other forms of universal joint may be employed instead of the eyes A⁶ Bˣ. The tool handle and shaft may, if desired, be longer than usual and be shaped differently.

Obviously the attachment above described may be sold in combination with an ordinary fork or spade or independently thereof as an attachable accessory therefor.

What we claim is:

1. A digging implement comprising a tool head, a shaft therefor, and a device comprising a pedestal portion the top of which is attached to said shaft and a tread-plate portion attached to the base of the pedestal portion, and spring-controlled hinging means including a hinge pin and a torsionally energizable coil spring embracing said pin, said hinging means connecting said pedestal and tread plate portions together and normally keeping them angularly spread apart and becoming energised when the user forces the pedestal angularly towards the tread plate by the initial heaving action on the soil.

2. A digging implement comprising a tool head, a shaft therefor, and a device comprising a pedestal portion, a tread-plate portion, and a hinge pin connecting the base of said pedestal portion to said tread-plate portion, in combination with means universally attaching the top of said pedestal portion to the implement shaft, and coil spring means embracing said hinge pin so that said coil spring means becomes torsionally energised by the downward levering movement of the shaft towards the soil after said tool head has been buried therein and so that, as the soil yields, the torsionally energised spring will give out its energy in causing an upward and forward movement of the implement and particularly the tool head and thereby facilitate the displacement and dispersal of the soil.

3. A digging implement comprising a tool head, a shaft therefor, and a device comprising a pedestal portion, a tread-plate portion attached to the base of the pedestal portion, and torsionally energisable spring-controlled hinging means connecting said pedestal and tread-plate portions together and normally keeping them angularly spread apart and becoming energised when the user forces the pedestal angularly towards the tread plate by the initial heaving action on the soil, and universal jointing means between the implement shaft and the top of the aforesaid pedestal, said spring-controlled hinging means comprising a hinge pin and coil spring embracing said pin and anchored at its ends to said pedestal and tread plate respectively.

4. A digging implement comprising a tool head, a shaft therefor, and a device comprising a pedestal portion, a tread-plate portion attached to the base of the pedestal portion, and torsionally energisable spring-controlled hinging means connecting said pedestal and tread-plate portions together and normally keeping them angularly spread apart and becoming energised when the user forces the pedestal angularly towards the tread plate by the initial heaving action on the soil, and universal jointing means between the implement shaft and the top of the aforesaid pedestal, said jointing means comprising a collar embracing said shaft and having an eye, and a second eye interlinked with the first and carried on the top of the pedestal, said spring-controlled hinging means comprising a hinge pin and coil spring embracing said pin and anchored at its ends to said pedestal and tread plate respectively.

5. A digging implement comprising a tool head, a shaft therefor, and a device comprising a pedestal portion the top of which is attached to said shaft and a tread-plate portion attached to the base of the pedestal portion, and spring-controlled hinging means connecting said pedestal and tread-plate portions together and normally keeping them angularly spread apart and becoming energised when the user forces the pedestal angularly towards the tread plate by the initial heaving action on the soil, said spring-controlled hinging means comprising a hinge pin and coil spring embracing said pin and anchored at its ends to said pedestal and tread plate respectively.

6. A digging implement comprising a tool head, a shaft therefor, and a device comprising a pedestal portion the top of which is attached to said shaft and a tread-plate portion attached to the base of the pedestal portion, and torsionally energisable spring-controlled hinging means connecting said pedestal and tread-plate portions together and normally keeping them angularly spread apart and becoming energised when the user forces the pedestal angularly towards the tread plate by the initial heaving action on the soil and including means to limit the spreading action of the spring means as between said pedestal and said tread plate, said spring-controlled hinging means comprising a hinge pin and coil spring embracing said pin and anchored at its ends to said pedestal and tread plate respectively.

7. A device for attachment to a digging implement, said device comprising a pedestal portion the top of which is attachable to the shaft of the implement, a tread-plate portion attached to the base of the pedestal portion, and torsionally energised spring-controlled hinging means connecting said pedestal and tread plate portions together and normally keeping them angularly spread apart, said spring-controlled hinging means comprising a hinge pin and coil spring embracing said pin and anchored at its ends to said pedestal and tread-plate portions respectively.

GEORGE HARRY GASCOIGNE.
JONAS ARTHUR KINGSTON.

REFERENCES CITED

The following references are of record in the file of this patent:

FOREIGN PATENTS

| Number  | Country       | Date           |
|---------|---------------|----------------|
| 560,616 | France        | July 16, 1923  |
| 139,718 | Germany       | Mar. 27, 1903  |
| 416,524 | Great Britain | Sept. 17, 1934 |